United States Patent [19]

Sherman et al.

[11] Patent Number: 5,054,660
[45] Date of Patent: Oct. 8, 1991

[54] SELF-DOSING MEASURING CHAMBER AND CONTAINER

[75] Inventors: Adam Sherman, Brooklyn, N.Y.; Peter Stagl, Morris Plains, N.J.

[73] Assignee: Colgate-Palmolive Co., Piscataway, N.J.

[21] Appl. No.: 459,616

[22] Filed: Jan. 2, 1990

[51] Int. Cl.⁵ ............................................. G01F 11/26
[52] U.S. Cl. .................... 222/454; 222/568
[58] Field of Search .............. 222/454, 456, 109, 111, 222/457, 424.5, 568

[56] References Cited

U.S. PATENT DOCUMENTS

| | | | |
|---|---|---|---|
| 999,067 | 7/1911 | Vergona | 222/454 X |
| 1,972,154 | 9/1934 | Martin | 222/425 |
| 2,091,929 | 8/1937 | Kappenberg | 222/455 |
| 2,730,270 | 1/1956 | Heinemann | 222/205 |
| 3,254,809 | 6/1966 | Breneman | 222/442 |
| 4,079,859 | 3/1978 | Jennings | 222/1 |
| 4,646,948 | 3/1987 | Jennings | 222/454 |
| 4,666,065 | 5/1987 | Ohren | 222/109 |

FOREIGN PATENT DOCUMENTS

| | | | |
|---|---|---|---|
| 343638 | 11/1989 | European Pat. Off. | 222/454 |
| 2802210 | 7/1979 | Fed. Rep. of Germany | 222/456 |
| 854602 | 4/1940 | France | 222/454 |
| 701768 | 12/1953 | United Kingdom | 222/454 |

Primary Examiner—Michael S. Huppert
Attorney, Agent, or Firm—Michael J. McGreal; Murray M. Grill; Robert C. Sullivan

[57] ABSTRACT

There is disclosed a self-dosing container having an upper measuring chamber which has an inlet delivery spout and an exit spout. The inlet delivery spout is configured so that a lower part of the wall of this spout is at or below the lowest point of the exit spout and the highest point of this spout is at or above the highest point of the exit spout. This provided for a proper dosing action.

21 Claims, 2 Drawing Sheets

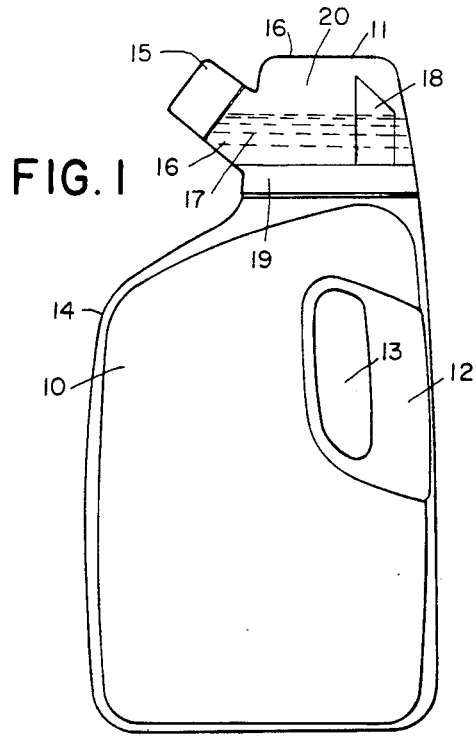
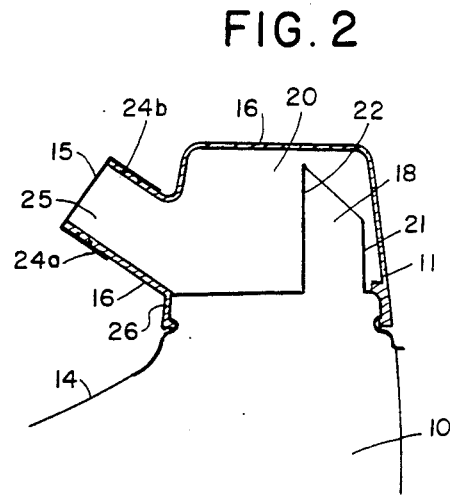
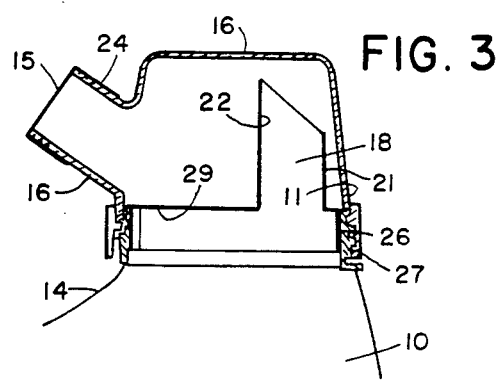
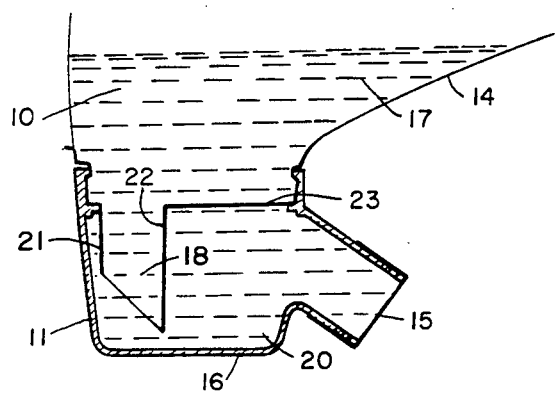
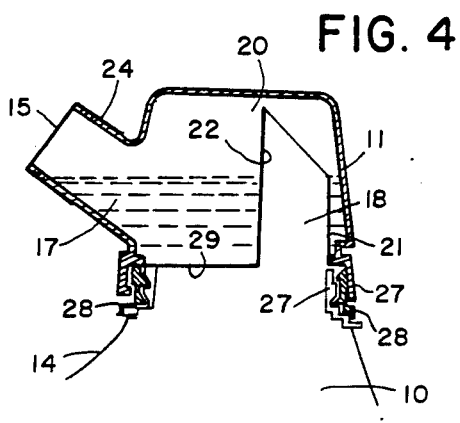

FIG. 6
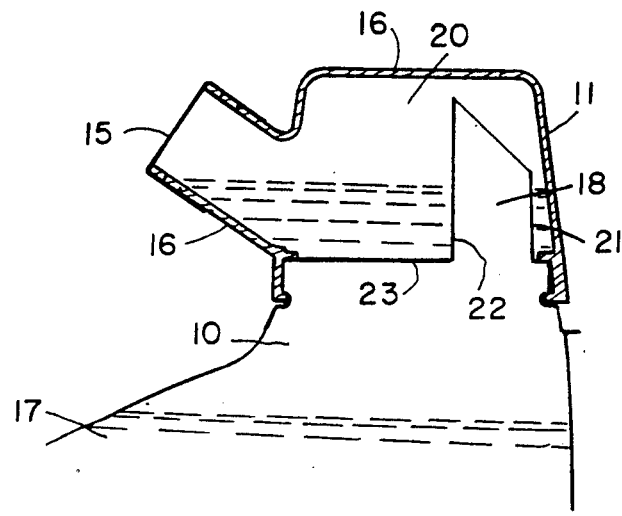
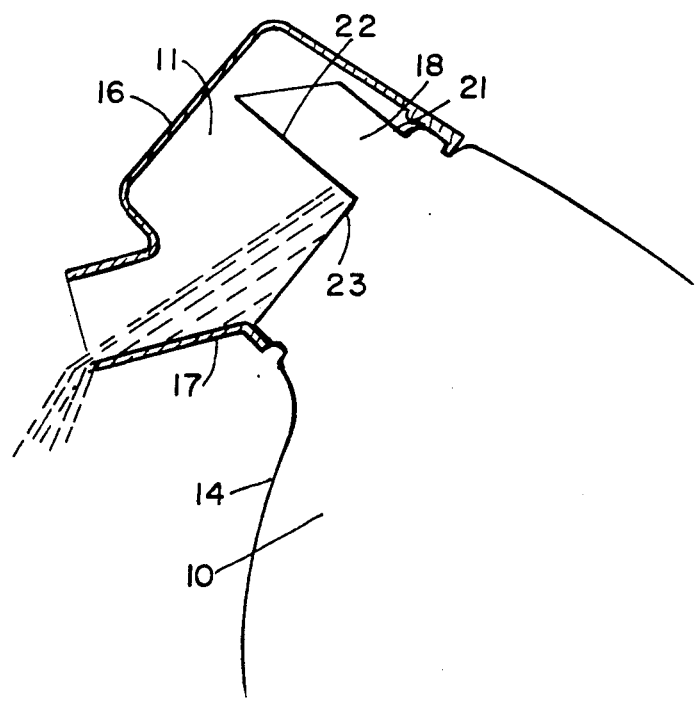
FIG. 7

SELF-DOSING MEASURING CHAMBER AND CONTAINER

BACKGROUND OF THE INVENTION

This invention relates to a self-dosing measuring chamber and container. More particularly this invention relates to a bottle which has a part thereof an upper cover portion which also serves as a measuring chamber to measure out the dosage of the substance to be used from the container.

In the use of many liquid products it is necessary to measure out a particular amount for use at any one time. This can be done through the use of a measuring cup or some similar device. However, this then requires a container for the substance, and in addition a separate measuring device. It is more convenient if the measuring device can be an integral part of the container which contains the product to be measured. Most products are packaged in this way since it is then not required that the user of the product maintain a separate device for measuring the quantity of the product to be used. This decreases the possibility of spillage and further results in less wastage which results from some of the product always being left in the measuring device. The solution to this problem has been to use self-dosing liquid measuring and pour devices. By self-dosing it is meant that the container has as an integral part thereof a means to measure the quantity of the product that is to be used. That is, the container will have as an integral apart a means to determine the dose of the product that is to be used.

The present invention is directed to a self-dosing container having a measuring chamber in its upper cover. This self-dosing container is simple in construction and quite easy to use. The container and the base part of the measuring chamber can be one integral part. This would consist of a container with a molded top portion. This top portion also contains a spout for delivering the product contained in the container into a measuring chamber. It is also a particular embodiment that the base part of the measuring chamber be a separate piece from the container. In such an arrangement the measuring chamber would contain the full dosing mechanism. The measuring chamber would be attached to the container via screw threads or by some clamping mechanism. Regardless of the exact structure of the container and the cap there is provided an apparatus that is simple in construction and easy to use.

The prior art contains many different types of self-dosing devices for containers such as bottles. These consist of various general types of devices. Various known self-dosing devices include pump devices, a squeeze bottle with a metering well, a squeeze bottle with ball follower, air valve metering, metering well in a bottle, siphoning techniques, a measuring cavity built into the cap, a gravity timed ball check, a measuring cavity built into a bottle handle, an internal metering with a ball valve and measuring caps. These all operate on different principles. The present technique is based on a measuring chamber built into an upper part which is usually reserved for a cap. This new self-dosing device has been found to be simple in design, have a low cost, and rather easy to use.

In U.S. Pat. No. 2,091,929 there is shown the use of a measuring cavity built into a cap as a dispenser. This dispenser consists of an upwardly extending spout from the base of the container cap. There is also an upwardly extending exit spout. In use, the bottle or other container which is attached to this dispenser is inverted in order to fill a part of the cap. The container or bottle is then placed upright whereby a particular amount of product in the container or bottle is measured out into the cap. Then upon tilting the bottle or container the measured dosage of product can be delivered from the container or bottle. However, a problem with this device is that when the container or bottle is tilted to deliver a dosage of product there is the possibility of leakage from the bottle.

In U.S. Pat. No. 2,730,270 there is disclosed a squeeze bottle and liquid measuring and dispensing device attached to this bottle. This device consists of a cap portion which contains tubing which extends from above the cap down to near the bottom of the bottle or container. There is an outlet in the region of the top of the cap. In using this device, the bottle is squeezed which forces liquid up a tube and into the liquid measuring region. The bottle can then be inverted in order to dispense the measured amount of liquid.

In U.S. Pat. No. 3,254,809 there is disclosed a dispensing device for tilting containers. This dispensing device consists of a container with a cap which has a self-dosing mechanism. In this cap, there are two conduits which communicate between the bottle and the cap. One of these conduits is for delivery of the material which is to be dispensed from the container while the other conduit is set so as to determine the amount of the dosage. In usage, the bottle is tilted rearwardly so that some of the product will flow from the bottle into the dispensing cap. After the dosage amount has been delivered from the bottle to the cap, the bottle is brought into an upright position, the cover removed or opened and the bottle tilted forwardly in order to deliver the measured amount of product from the bottle.

U.S. Pat. No. 4,079,859 discloses a technique and device for measuring the dosage of fluids. In essence, the device consists of a measuring chamber built into a cap. There is disclosed in this patent a bottle which has attached to the exit opening a cap which is in essence a second bottle. Extending upwardly into this dispensing cap is a spout which interconnects into the bottle which contains the product. This upper bottle contains a closure. In order to dispense a given amount of liquid, the bottle is tilted forwardly until the desired amount of liquid from the bottle flows upwardly into the cap measuring portion. When the given amount has been flowed into the cap measuring portion, the bottle is then brought into an upright position. The closure on the measuring cap is then removed and the bottle tilted forwardly again. In this second forward tilting since the cap has been removed from the dispensing cap, the dosage of product can then be delivered to the point where needed.

U.S. Pat. No. 4,646,948 discloses a measuring container with a modified pour spout. This pour spout can be an integral part of the container or it can be part of the cap for the container. In one particular embodiment, there is shown an upwardly extending channel into an upper dose measuring region. The dose measuring region has a cap closure. In usage, the container is inverted until the desired amount of liquid has passed from the bottle up into the measuring cap. After this has occurred, the cap closure is removed and the measured dosage is dispensed from the container. This is an interesting self-dosing technique, however, it has several drawbacks. A particular drawback is that with the exit cap in the top of the measuring chamber the bottle will have to be tilted to such an extent to dispense the measured amount of substance that more of the substance can be accidentally permitted to flow from the bottle.

U.S. Pat. No. 4,666,065 discloses yet a further liquid measuring and pouring device. This is fairly complex liquid measuring and pouring device. It consists of a cap portion which can be placed on a bottle or the like and which has chambers which extend in opposite directions. The chamber that extends in a first direction is utilized to measure the amount of a substance that is desired to be removed from the bottle and to hold it until it is desired to dispense the substance. At that point, the cap on one end of the closure is removed and the measured substance is dispensed by tilting the bottle forwardly in the direction of the spout so that the dosage in the measuring chamber can be emptied. Besides being quite intricate, this dosage measuring device requires a considerable amount of space and will require a fairly high degree of structural integrity.

BRIEF SUMMARY OF THE INVENTION

The various problems of the prior art are resolved in the present self-dosing container. As has been pointed out above this self-dosing container is very simple in structure and very easy to use. The dosing mechanism fits onto the top of containers and requires a minimum of extra space. This is important since added space will mean increase packaging costs as well as the ability to stack fewer of the items onto a store shelf. Consequently, the objective is to have a simple, workable, and yet compact self-dosing container. This is accomplished by having an upper cover portion which is also a measuring chamber. This measuring chamber communicates with the bottle through an inlet delivery spout. This measuring chamber communicates with the exterior through an outlet spout which has a cap closure. The inlet delivery spout has particular dimensions. The wall of the inlet delivery spout which faces the outlet spout is of a height of about the upper surface of the outlet spout. The wall of the delivery spout which is adjacent to the wall of the measuring chamber is of a height slightly below that of the lower surface of the outlet spout. The dimensions of this inlet delivery spout are important. These dimensions will determine the amount of substance from the bottle that is measured into the measuring chamber, and further will ensure that when this measured amount is poured from the measuring chamber that additional product is not poured from the bottle.

BRIEF DESCRIPTION OF THE DRAWINGS

FIG. 1 is an elevational view of a self-dosing bottle container.

FIG. 2 is a sectional view in elevation of the self-dosing bottle wherein part of the upper cover structure is an integral part of the container.

FIG. 3 is an elevational sectional view of the self-dosing container showing the base portion of the measuring chamber to be inserted into the neck of the container.

FIG. 4 is a sectional elevational view of the self-dosing container wherein the base of the measuring chamber is threadly connected to the bottle container and wherein the measuring chamber is shown in the position of having received liquid from the container.

FIGS. 5, 6, and 7 illustrate the sequence for using the present self-dosing container.

DETAILED DESCRIPTION OF THE INVENTION

The present self-dosing container will be described with regard to a bottle container. A bottle container, and one that is used to hold a detergent, soap solution, fabric softener or the like is a preferred use for the present self-dosing container.

With particular reference to FIG. 1 there is shown a bottle 10 and upper cover portion 11. The bottle has a handle 12 with an opening 13 whereby the handle can be easily gripped. The container has a continuous wall 14. This bottle container can be of essentially any shape or design. The presently depicted bottle is one of a general design that is used for containing detergents, soap solutions and fabric softeners. It is the upper cover portion 11 that contains the self-dosing mechanism. The upper cover portion 11 consists of a measuring chamber 20 which is defined by walls 16. In this embodiment the measuring chamber is shown as containing a dosage of the liquid 17 from the bottle. The measuring chamber is interconnected to the bottle by means of the attachment mechanism at 19. At one end of the upper cover 11 is a screw cap closure 15 which is used to open and close the exit spout of the measuring chamber. Within the measuring chamber and distant from the exit spout, there is the inlet delivery spout 18. It is through this inlet delivery spout that liquid is fed to the measuring chamber from the bottle.

FIG. 2 is a side elevational view of an embodiment of the measuring chamber of the bottle of FIG. 1. In FIGS. 2, 3, and 4 the mechanism of operation of the self-dosing is the same. However, the structure of the upper cover which contains the measuring chamber, and in particular the means of connecting the upper cover to the bottle is shown in different embodiments. In FIG. 2, part of the self-dosing structure is a part of the bottle. In this embodiment the upper bottle closure 23 and the walls 21 and 22 of the delivery spout 18 will be formed along with the walls 14 of the bottle. One particular technique that can be utilized is blow molding. In this embodiment, after the bottle 10 along with the upper closure 23 with the inlet delivery spout 18 is formed the walls 22 and 21 of the inlet delivery spout are trimmed to the proper height. The height of the wall portion 22 and the wall portion 21 are important features in this self-dosing container. The wall 22 must be of a sufficient height so that when the bottle is tilted in order to deliver the measured volume for usage additional liquid will not flow from the bottle. The wall 21 is of a height which is slightly below the lowest point of the exit spout 24(a). This is necessary so that when the measuring chamber 20 is filled and the cap closure 15 removed that liquid in this measuring chamber will not inadvertently flow from the measuring chamber.

A minimum number of degrees of rotation of the bottle is needed to dispense material for neatness and control. An angle of about 10 degrees is desirable. This angle increases as product is dispensed to the point that the bottle is inverted when it is nearly empty. That is, there is control of the amount of liquid in the measuring chamber and the flow of liquid from the bottle while liquid is being poured.

The structure of this measuring a chamber is dependent of the structure of this inlet delivery spout. Generally, the wall or walls of this spout will form an angle of at least about 30 degrees and preferably at least about 45 degrees at the spout opening. This is the angle between the lowest point of the spout opening and the highest point of the spout opening.

FIG. 3 shows a related embodiment of the self-dosing container of FIG. 2. In this embodiment, the bottle 10 is an open necked bottle. The closure piece 29 for the open neck bottle fits downwardly as a tight fit into the neck of the bottle. This is a friction fit. That is, wall 26 of this closure piece fits tightly into the neck 27 of the bottle. This closure piece carries the inlet delivery spout 18. In all other aspects, this self-dosing cap is the same as that which is shown in FIG. 2.

FIG. 4 shows a further embodiment of the self-dosing container. In this embodiment, the closure for the bottle is a screw closure which also contains the delivery inlet 18. In this embodiment, threads on the exterior of the neck 27 of the bottle are contacted on by the threads on the interior of wall 28 of the closure. In all other respects, this self-dosing container is essentially the same as that of FIG. 2. For illustrative purposes in this figure the measuring chamber 20 is shown as containing liquid 17 from the bottle 10.

FIGS. 5, 6, and 7 disclose the use of the present self-dosing container.

In FIG. 5, the container is shown in a tilted orientation. The tilt, or degree of rotation, will vary as the bottle is emptied. Here the bottle is shown to be inverted (90 degree rotation) which is a position that will be used when the bottle is almost fully emptied. Initial doses will require only about 10 degrees of rotation. In this orientation, liquid 17 of the container flows through inlet delivery spout 18 to the dose measuring chamber 20. In this orientation, it is seen that the dose measuring chamber 20 can become partially or fully filled with the liquid 17. However in the next step, which is shown in FIG. 6 the bottle 10 is set into an upright orientation with the excess liquid that had flowed into the measuring chamber 20 now flowing downwardly back through the inlet delivery spout 18 and back into a bottle 10. As has been pointed out, the amount of liquid 17 that will remain in the measuring chamber 20 will be determined by the height of the wall 21 of inlet spout 18. Any liquid that would be above the height of this wall would flow downwardly back into a bottle 10. It is also to be noted that in the orientation of FIG. 6, the liquid that is in the measuring chamber 20 is at a level which is below the lowest point 24(a) of exit spout 25. After the bottle 10 has been put into this orientation, the cap 15 is removed and the bottle is tilted to pour the contents of the measuring chamber 20 into a point of usage.

Generally, after the sequence of FIGS. 5 through 7 has been completed, the cap 15 will be put back onto the bottle 11 and the bottle with cap closure stored. However, if it is desired to use another dose of the liquid from the bottle 10 after the cap closure 15 has been replaced onto the self-dosing cap 10, the procedure of FIGS. 5 through 7 can be repeated.

In the present embodiment, the cap 15 is shown to be threadedly attached to the self-dosing cap 11. Other techniques can be utilized. However, using a threaded connection provides for a connection which assures that liquid will not leak from the bottle at this point.

The container and cover portions can be made out of any convenient material. However, the preferred materials are various conventional and readily available plastics. These plastics include high density polyethylene, low density polyethylene, polypropylene, polybutadiene, polyvinyl chloride, polyvinyl alcohol, polyvinyl acetate, polyethylene terephthalate, polybutadiene terephthalate and various copolymers of these polymeric materials. In essence, essentially, any polyene and/or polyester can be utilized for the various parts of the self-dosing container. The actual materials to be utilized will depend on the liquid material to be contained in the self container as well as on the desired shape, size and other characteristics of the self-dosing container. In essence, there is no particular limitation with regard to the materials that can be utilized to fabricate either the container portion or the cover portion.

It is likewise the case that the bottle 10 and the self-dosing cap 11 can be of essentially any convenient size.

We claim:

1. A measuring chamber for a container comprising a closure adapted to be sealably connected to the neck of a container and a separable housing extending upwardly from said closure and defining a chamber, a sealable exit spout in the sidewall of said chamber, and an inlet delivery spout extending vertically upwardly from said closure into said chamber to deliver a substance to said chamber and located adjacent but separated from the chamber wall opposite the sealable exit spout, said inlet delivery spout having a shape whereby the inlet delivery spout wall adjacent the measuring chamber wall is of a height less than the remainder of the inlet delivery spout wall and of a height less than the lower edge of the skit spout opening with the highest part of said inlet delivery spout being at a height above the lower edge of the exit spout and adjacent the top of said chamber.

2. A measuring chamber as in claim 1 wherein the wall of the inlet delivery spout facing the exit spout is of a height of about that of the upper end of the exit spout.

3. A measuring chamber as in claim 1 wherein the wall of the inlet delivery spout facing the exit spout is of a height of greater than that of the upper end of the exit spout.

4. A measuring chamber as in claim 1 wherein the wall of the inlet delivery spout adjacent the wall of the measuring chamber is of a height lower than that of the lower end of the exit spout.

5. A measuring chamber as in claim 1 wherein the angle of the outlet of the inlet delivery spout is at least about 30 degrees.

6. A measuring chamber as in claim 1 wherein the angle of the outlet of the inlet delivery spout is at least about 45 degrees.

7. A measuring chamber as in claim 1 wherein said exit spout has a threaded closure.

8. A self-dosing container comprising a container portion and a cover portion sealably connected to the neck of said container portion, said cover portion comprising a separable closure and housing, said housing extending vertically upwardly from said closure and defining a measuring chamber, a sealable exit spout in the sidewall of said measuring chamber, and an inlet delivery spout extending vertically upwardly from said closure into said measuring chamber and located adjacent but separated from the chamber wall opposite the sealable exit spout, said delivery spout having a shape whereby the inlet delivery spout wall adjacent the measuring chamber wall is of a height less than the remainder of the inlet delivery spout walls and of a height less than the lower edge of the exit spout opening with the highest part of said inlet delivery spout being at a height above the lower edge of the exit spout and adjacent the top of said chamber.

9. A self-dosing container as in claim 8 wherein the wall of the inlet delivery spout facing the exit spout is of a height of about that of the upper end of the exit spout.

10. A self-dosing container as in claim 8 wherein the wall of the inlet delivery spout facing the exit spout is of a height of greater than that of the upper end of the exit spout.

11. A self-dosing container as in claim 8 wherein the wall of the inlet delivery spout adjacent the wall of the measuring chamber is of a height lower than that of the lower end of the exit spout.

12. A self-dosing container as in claim 8 wherein the angle of the outlet of the inlet delivery spout is at least about 30 degrees.

13. A self-dosing container as in claim 8 wherein the angle of the outlet of the inlet delivery spout is at least about 45 degrees.

14. A self-dosing container bottle as in claim 8 wherein said exit spout has a threaded closure.

15. A self-dosing container comprising a container portion and a cover portion sealably connected to said container portion, said cover portion comprising a housing extending vertically upwardly from said container and defining a measuring chamber, a sealable exit spout in the sidewall of said measuring chamber, and an inlet delivery spout extending vertically upwardly from the upper surface of said container portion into said measuring chamber and located adjacent but separated from the chamber wall opposite the sealable exit spout, said inlet delivery spout having a shape whereby the inlet delivery spout wall adjacent the measuring chamber wall is of a height less than the remainder of the inlet delivery spout wall and of a height less than the lower edge of the exit spout opening with the highest part of said inlet delivery spout being at a height above the lower edge of the exit spout and adjacent the top of said chamber.

16. A self-dosing container as in claim 15 wherein the wall of the inlet delivery spout facing the exit spout is of a height of about that of the upper end of the exit spout.

17. A self-dosing container as in claim 15 wherein the wall of the inlet delivery spout facing the exit spout is of a height of greater than that of the upper end of the exit spout.

18. A self-dosing container as in claim 15 wherein the wall of the inlet delivery spout adjacent the wall of the measuring chamber is of a height lower than that of the lower end of the exit spout.

19. A self-dosing container as in claim 15 wherein the angle of the upper end of the sidewall of the inlet delivery spout is at least about 30 degrees.

20. A self-dosing container bottle as in claim 15, wherein the angle of the upper end of the sidewall of the inlet delivery spout is at least about 45 degrees.

21. A self-dosing container as in claim 15 wherein said exit spout has a threaded closure.

* * * * *